(12) United States Patent
Weaver et al.

(10) Patent No.: US 11,855,910 B2
(45) Date of Patent: Dec. 26, 2023

(54) CONFIGURATION MANAGEMENT OF CLOUD RESOURCES FOR MULTIPLE PROVIDERS AND FRAMEWORKS

(71) Applicant: Intuit Inc., Mountain View, CA (US)

(72) Inventors: Brett Weaver, San Diego, CA (US); Edward Lee, Sunnyvale, CA (US); Thomas C. Bishop, San Diego, CA (US); Jerome M. Kuptz, Mountain View, CA (US); Mukulika Kapas, Mountain View, CA (US); Ameen Radwan, Mountain View, CA (US); Gennadiy Ziskind, San Mateo, CA (US); Grant L. Hoffman, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 210 days.

(21) Appl. No.: 17/544,467

(22) Filed: Dec. 7, 2021

(65) Prior Publication Data

US 2023/0179541 A1 Jun. 8, 2023

(51) Int. Cl.
*H04L 47/70* (2022.01)
*H04L 41/0813* (2022.01)

(52) U.S. Cl.
CPC .......... *H04L 47/82* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 2013/0152047 A1* | 6/2013 | Moorthi | G06F 11/3688 717/124 |
| 2015/0379076 A1* | 12/2015 | Grosse | G06F 16/2448 707/718 |
| 2023/0179541 A1* | 6/2023 | Weaver | H04L 47/82 709/226 |

* cited by examiner

Primary Examiner — Thanh T Nguyen
(74) Attorney, Agent, or Firm — Paradice & Li LLP

(57) ABSTRACT

Systems and methods for synchronizing cloud resources are disclosed. An example method may include receiving a first request to synchronize first target cloud resources to a first specified state defined in a configuration repository, generating one or more first configuration commands corresponding to the first request, the one or more first configuration commands associated with a first cloud provider and a first cloud configuration framework, and executing the one or more first configuration commands to set a state of the first target cloud resources to the first specified state.

20 Claims, 4 Drawing Sheets

CONFIGURATION MANAGEMENT OF CLOUD RESOURCES FOR MULTIPLE PROVIDERS AND FRAMEWORKS

TECHNICAL FIELD

This disclosure relates generally to cloud computing, and more particularly to storing and synchronizing states of cloud computing resources.

DESCRIPTION OF RELATED ART

Companies and individuals increasingly make use of cloud computing in order to deliver computing resources over networks such as the Internet. Deploying computing resources via the cloud may offer cost savings, in addition to improved scalability, performance, and economies of scale. Cloud computing deployments may provide services and solutions which end users or customers may access on demand, such as software as a service (SaaS), platform as a service (PaaS), infrastructure as a service (IaaS) and so on. Cloud computing deployments may use one or more of a number of cloud computing providers. In addition, cloud computing deployments may use different configuration frameworks—development tools, middleware, database services, and other tools which may ease the creation, deployment, and management of cloud computing resources.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for synchronizing cloud resources. An example method may include receiving a first request to synchronize first target cloud resources to a first specified state defined in a configuration repository, generating one or more first configuration commands corresponding to the first request, the one or more first configuration commands associated with a first cloud provider and a first cloud configuration framework, and executing the one or more first configuration commands to set a state of the first target cloud resources to the first specified state.

In some aspects, the one or more configuration commands are generated to be interpretable to the first cloud provider. In some aspects, the one or more configuration commands are generated to be interpretable to the first cloud configuration framework. In some aspects, the one or more configuration commands are generated based at least in part on one or more state files in the configuration repository. In some aspects, the first request corresponds to a version and a location of one or more state files in the configuration repository associated with the first specified state. In some aspects, the configuration repository is a Git repository.

In some aspects, the method further includes receiving a second request to synchronize second target cloud resources to a second specified state defined in the configuration repository, generating one or more second configuration commands corresponding to the second request, the one or more second configuration commands associated with a second cloud provider and a second cloud configuration framework, and executing the one or more second configuration commands to set a state of the second target cloud resources to the second specified state. In some aspects, the first cloud provider is different from the second cloud provider. In some aspects, the first cloud configuration framework is different from the second cloud configuration framework.

Another innovative aspect of the subject matter described in this disclosure can be implemented in a system for synchronizing cloud resources. An example system includes one or more processors, and a memory storing instructions for execution by the one or more processors. Execution of the instructions causes the system to perform operations including receiving a first request to synchronize first target cloud resources to a first specified state defined in a configuration repository, generating one or more first configuration commands corresponding to the first request, the one or more first configuration commands associated with a first cloud provider and a first cloud configuration framework, and executing the one or more first configuration commands to set a state of the first target cloud resources to the first specified state.

In some aspects, the one or more configuration commands are generated to be interpretable to the first cloud provider. In some aspects, the one or more configuration commands are generated to be interpretable to the first cloud configuration framework. In some aspects, the one or more configuration commands are generated based at least in part on one or more state files in the configuration repository. In some aspects, the first request corresponds to a version and a location of one or more state files in the configuration repository associated with the first specified state. In some aspects, the configuration repository is a Git repository.

In some aspects, the operations further include receiving a second request to synchronize second target cloud resources to a second specified state defined in the configuration repository, generating one or more second configuration commands corresponding to the second request, the one or more second configuration commands associated with a second cloud provider and a second cloud configuration framework, and executing the one or more second configuration commands to set a state of the second target cloud resources to the second specified state. In some aspects, the first cloud provider is different from the second cloud provider. In some aspects, the first cloud configuration framework is different from the second cloud configuration framework.

Another innovative aspect of the subject matter described in this disclosure can be implemented in a non-transitory computer-readable storage medium storing instructions for execution by one or more processors of a system. Execution of the instructions causes the system to perform operations including receiving a first request to synchronize first target cloud resources to a first specified state defined in a configuration repository, generating one or more first configuration commands corresponding to the first request, the one or more first configuration commands associated with a first cloud provider and a first cloud configuration framework, and executing the one or more first configuration commands to set a state of the first target cloud resources to the first specified state.

In some aspects, the operations further include receiving a second request to synchronize second target cloud resources to a second specified state defined in the configuration repository, generating one or more second configuration commands corresponding to the second request, the one or more second configuration commands associated with a second cloud provider, the second cloud provider different from the first cloud provider, and a second cloud configuration framework, the second cloud configuration framework different from the first cloud configuration framework, and executing the one or more second configuration commands to set a state of the second target cloud resources to the second specified state.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
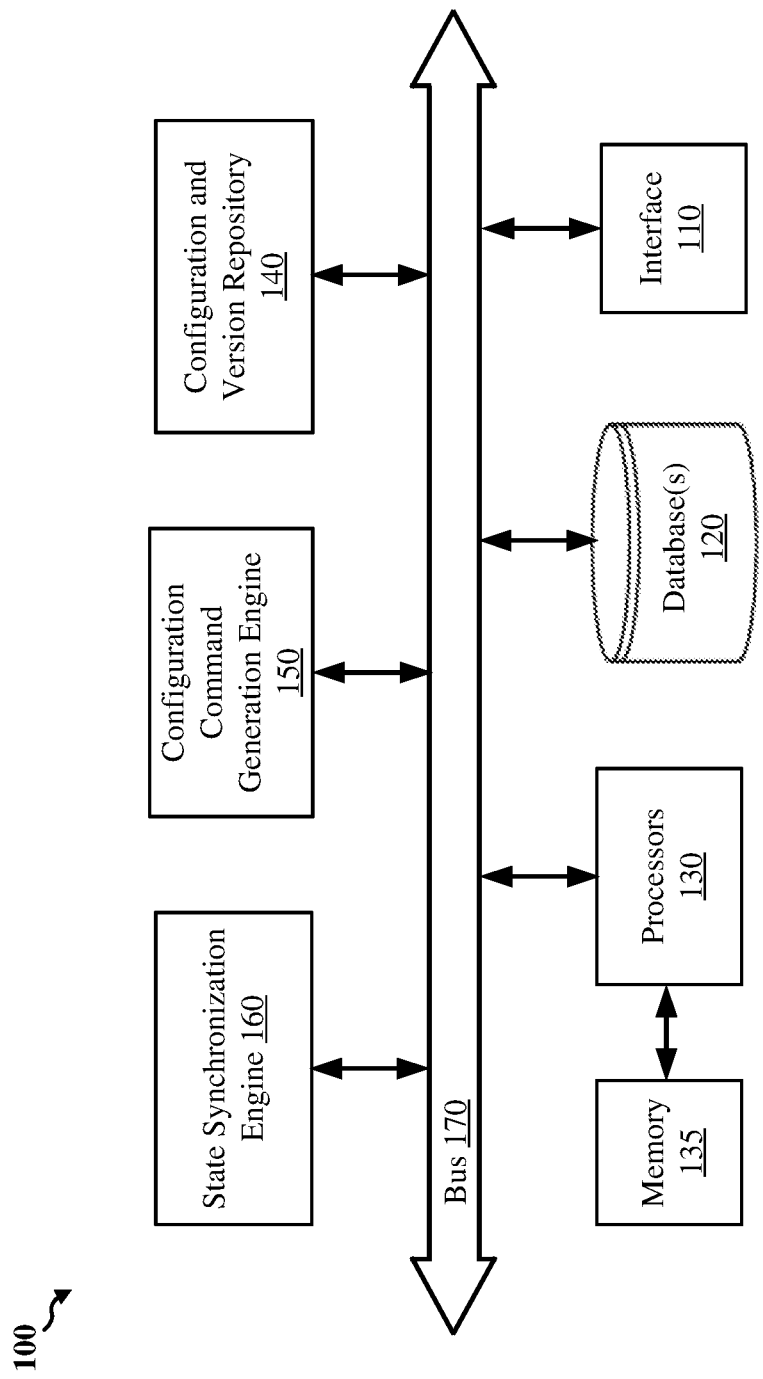
FIG. 1 shows a cloud resource synchronization system, according to some implementations.

Implementations of the subject matter described in this disclosure may be used to synchronize cloud computing resources for deployments using any of a variety of cloud providers and cloud configuration frameworks. More particularly, in response to a received request to synchronize target cloud resources to a given state, a configuration command may be generated. The configuration command is generated according to the appropriate cloud provider and cloud configuration framework. For example, the configuration command may be based on state and version information in a configuration repository or version repository, on data associated with the appropriate cloud configuration framework, and on the target to be synchronized, such as the cloud provider and the account associated with the request. The generated configuration command may then be executed in order to set the state of the target cloud resources to the appropriate state. These and other aspects of the example implementations are discussed further below.

Various implementations of the subject matter disclosed herein provide one or more technical solutions to the technical problem of supporting synchronization of cloud resources associated with a variety of different cloud providers and cloud configuration frameworks using a single service. Example implementations may receive a first request to synchronize first target cloud resources to a first specified state defined in a configuration repository, generate one or more first configuration commands corresponding to the first request, where the one or more first configuration commands are associated with a first cloud provider and a first cloud configuration framework, and execute the one or more first configuration commands to set a state of the first target cloud resources to the first specified state. Configuration commands may be generated for each of multiple different cloud providers and cloud configuration frameworks. More specifically, various aspects of the present disclosure provide a unique computing solution to a unique computing problem that did not exist prior to the development of cloud computing resources which may be synchronized based on state information stored in configuration repositories. As such, implementations of the subject matter disclosed herein are not an abstract idea such as organizing human activity or a mental process that can be performed in the human mind.

Moreover, various aspects of the present disclosure effect an improvement in the technical field of synchronizing cloud resources associated with a variety of different cloud providers and cloud configuration frameworks using a single service. The use of a single service to synchronize target cloud resources for multiple different cloud providers and cloud configuration frameworks may allow for more efficient and cloud operations for an enterprise. For example, a single company may manage or operate cloud resources using different cloud providers and different cloud configuration frameworks and allowing a single service to be used to synchronize these cloud resources may result in more efficient and streamlined operations for that company. Storing and synchronizing states of cloud resources cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

FIG. 1 shows a cloud resource synchronization system 100, according to some implementations. Various aspects of the cloud resource synchronization system 100 disclosed herein may be applicable for synchronizing cloud resources in a variety of computing applications. Such functionality may be useful for allowing users to synchronize cloud computing resources in a wide variety of cloud computing applications, such as software as a service (SaaS) applications, platform as a service (PaaS) applications, infrastructure as a service (IaaS) applications, and so on.

The cloud resource synchronization system 100 is shown to include an input/output (I/O) interface 110, a database 120, one or more data processors 130, a memory 135 coupled to the data processors 130, a configuration and version repository 140, a configuration command generation engine 150, and a state synchronization engine 160. In some implementations, the various components of the cloud resource synchronization system 100 may be interconnected by at least a data bus 170, as depicted in the example of FIG. 1. In other implementations, the various components of the cloud resource synchronization system 100 may be interconnected using other suitable signal routing resources.

The interface 110 may include a screen, an input device, and other suitable elements that allow a user to provide information to the cloud resource synchronization system 100 and/or to retrieve information from the cloud resource synchronization system 100. Example information that can be provided to the cloud resource synchronization system 100 may include configuration information for the cloud resource synchronization system 100, such as information for configuring the configuration and version repository 140, configuration command generation engine 150, or state synchronization engine 160, and syntax and other command generation formatting information for one or more cloud providers and cloud configuration frameworks. Example information that can be retrieved from the cloud resource synchronization system 100 may include change logs and other differential information between a previous state of target cloud resources and a synchronized state of the target resources, error and other log information associated with synchronization operations, state files and version information to be saved in one or more external configuration or version repositories, and the like.

The database 120, which may represent any suitable number of databases, may store any suitable information pertaining to configuration of the cloud resource synchronization system 100, to users of the cloud resource synchronization system 100. For example, the information may include configuration information for generating configuration commands associated with one or more cloud providers or cloud configuration frameworks, target information, such as account information for one or more cloud providers, and project information identifying target cloud resources for which changes are authorized. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the cloud resource synchronization system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The configuration and version repository 140 may store state files associated with a cloud configuration, the state files for synchronizing target cloud resources to a specified state. The configuration and version repository 140 may also store version information associated with cloud configurations, such as a version number and a location of cloud configurations. For example, the configuration and version repository may include or be coupled to one or more repositories such as Git repositories, or other suitable repositories for storing configuration information and version information. In some aspects, all or part of the configuration and version repository 140 may not be located within the cloud resource synchronization system 100 but may instead be coupled to the cloud resource synchronization system 100 via one or more network resources.

The configuration command generation engine 150 may be used to generate configuration commands for target cloud resources in response to received synchronization requests. For example, in response to a received synchronization request, the configuration command generation engine 150 may generate one or more configuration commands for synchronizing target cloud resources to a specified state as reflected in state files of the configuration and version repository 140. As discussed further below, the configuration command generation engine 150 may generate the configuration commands in accordance with syntax of the appropriate cloud provider and cloud configuration framework. For example, configuration commands for synchronizing cloud resources in accordance with Microsoft Azure may be different than similar commands for synchronizing cloud resources in accordance with Google Cloud. Similarly, different configuration commands may be required for synchronizing cloud resources in accordance with various cloud configuration frameworks, such as Amazon Web Services (AWS) Cloud Development Kit (CDK), Terraform, and so on.

The state synchronization engine 160 may execute the configuration commands generated by the configuration command generation engine 150 in order to synchronize target cloud resources responsive to received synchronization requests. More particularly, the state synchronization engine 160 may execute generated configuration commands in order to synchronize target cloud resources based on the state files, the cloud configuration framework, and the cloud provider associated with received synchronization requests.

The particular architecture of the cloud resource synchronization system 100 shown in FIG. 1 is but one example of a variety of different architectures within which aspects of the present disclosure may be implemented. For example, in other implementations, the cloud resource synchronization system 100 may not include the configuration and version repository 140, the functions of which may be implemented by the processors 130 executing corresponding instructions or scripts stored in the memory 135. In further implementations, all or part of the configuration and version repository 140 may not be located within the cloud resource synchronization system 100 but may instead be coupled to the cloud resource synchronization system 100 via one or more network resources. In some other implementations, the functions of the configuration command generation engine 150 may be performed by the processors 130 executing corresponding instructions or scripts stored in the memory 135. Similarly, the functions of the state synchronization engine 160 may be performed by the processors 130 executing corresponding instructions or scripts stored in the memory 135.

Figure 2:
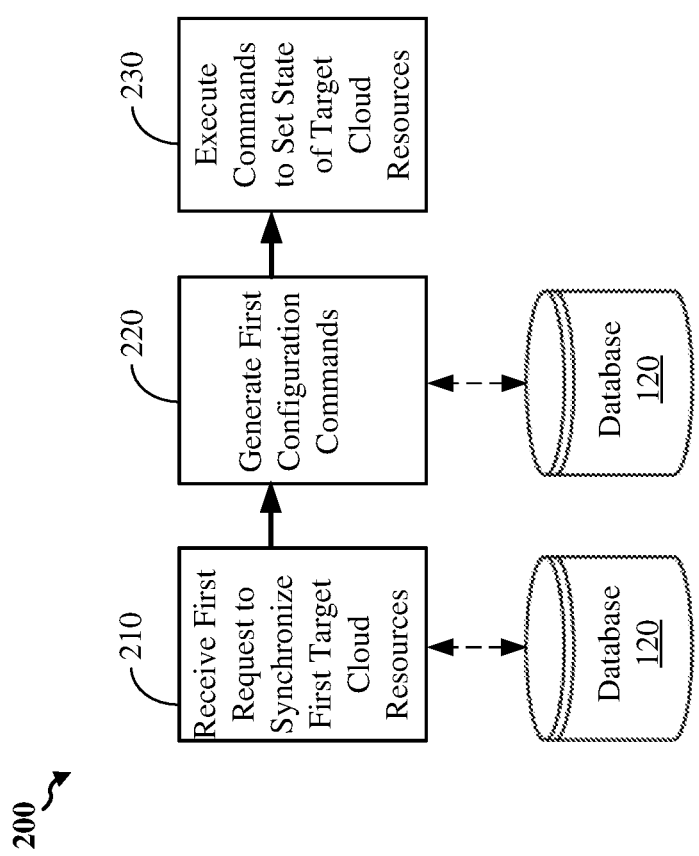
FIG. 2 shows a high-level overview of an example process flow that may be employed by the cloud resource synchronization system of FIG. 1.

FIG. 2 shows a high-level overview of an example process flow 200 that may be employed by the cloud resource synchronization system 100 of FIG. 1. In block 210, the cloud resource synchronization system 100 receives a first request to synchronize first target cloud resources, for example the first request may be received via the interface 110 or another network interface coupled to the cloud resource synchronization system 100. The first request may be a request to synchronize the first cloud resources to a first specified state defined in a configuration repository, such as the configuration and version repository 140.

In block 220, the cloud resource synchronization system 100 generates one or more first configuration commands corresponding to the first request. For example, the one or more first configuration commands may be generated using the configuration command generation engine 140. The one or more first configuration commands may be associated with a first cloud provider and a first cloud configuration framework. The one or more first configuration commands may be generated in accordance with syntax associated with the first cloud provider and the first cloud configuration framework.

In block 230, the cloud resource synchronization system 100 executes the one or more first configuration commands to set the state of the target cloud resources based on the state files, the first cloud configuration framework, and the first cloud provider.

Companies and individuals increasingly make use of cloud computing in order to deliver computing resources over networks such as the Internet. Such cloud computing deployments may use any of a variety of cloud providers, such as Amazon Web Services (AWS), Microsoft Azure, Google Cloud, Alibaba Cloud, IBM Cloud, Oracle, Salesforce, and so on. In addition, a variety of cloud configuration frameworks may be used in order to ease the creation, deployment, and management of cloud computing resources. For example, common cloud configuration frameworks may include AWS CDK, Terraform, OpenStack, Eucalyptus, the Ubuntu Cloud Infrastructure, among many others. However, this proliferation of different cloud providers and cloud configuration frameworks presents a problem for companies operating multiple cloud computing deployments, in that configuring and synchronizing deployments involving different cloud providers and different cloud configuration frameworks may require different procedures, complicating deployment, management, and maintenance.

The example implementations allow for a single system to support configuration and synchronization of cloud resources associated with a variety of different cloud platforms and cloud configuration frameworks. This may simplify and consolidate management of such cloud computing resources, particularly for enterprises having a variety of cloud computing deployments. Rather than separately configuring cloud resources for each supported cloud provider or cloud configuration framework, a single system may receive synchronization requests and generate configuration commands in accordance with the proper format for each cloud provider or cloud configuration framework.

Figure 3:
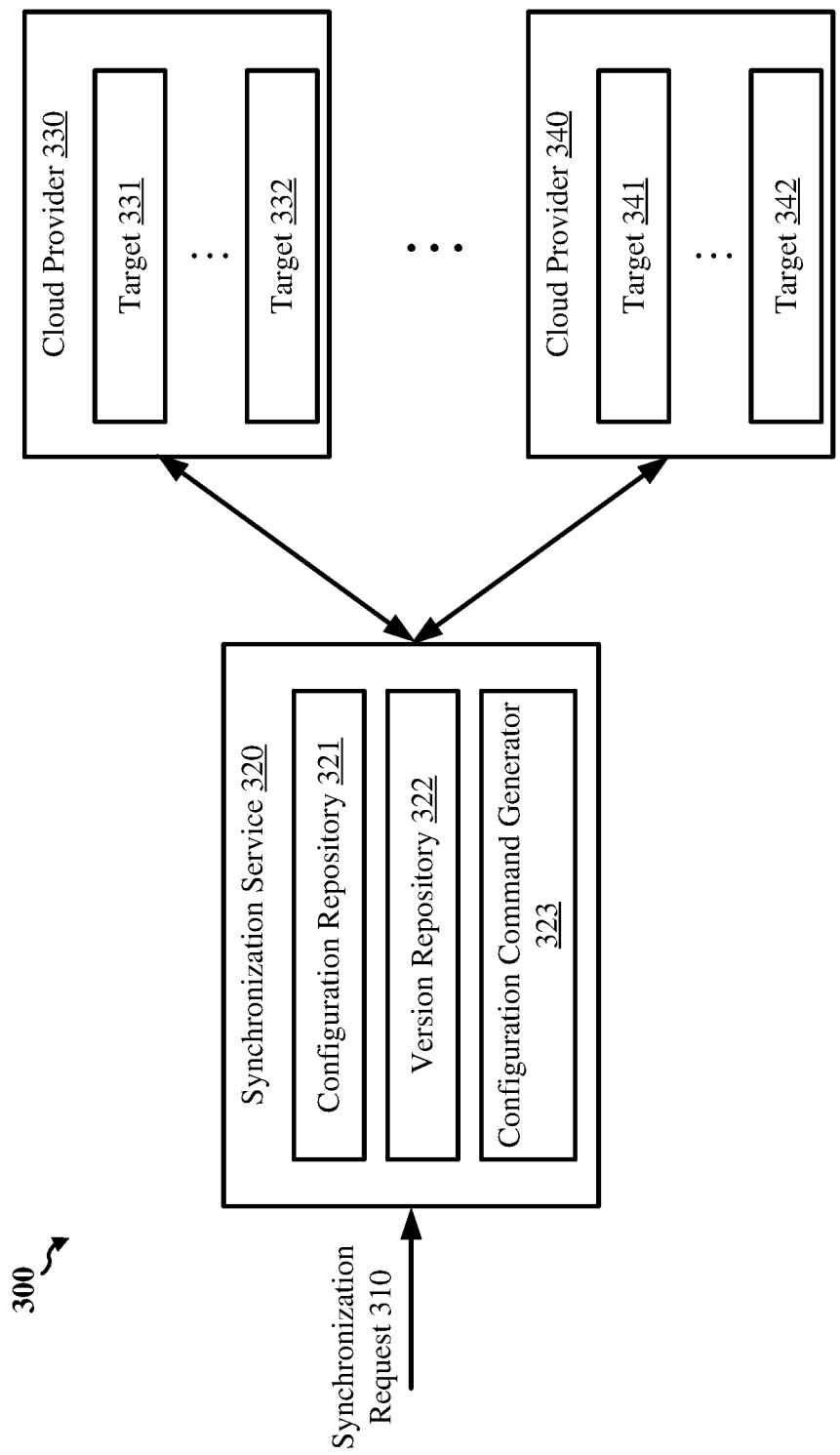
FIG. 3 shows an example cloud computing environment which may be used with the example implementations.

FIG. 3 shows an example cloud computing environment 300 which may be used with the example implementations. The cloud computing environment 300 may include a synchronization service 320, which may be one example of the cloud resource synchronization system 100, and a plurality of cloud providers 330-340. The synchronization service 320 may include or be coupled to a configuration repository 321 and a version repository 322. The configuration repository 321 and version repository 322 may be one example of the configuration and version repository 140. The synchronization service 320 may also include a configuration command generator 323. The configuration command generator may be one example of the configuration command generation engine 150 and the state synchronization engine 160. Each of the cloud providers may include a plurality of targets, where each target corresponds to cloud computing resources and to an account associated with the cloud provider. Thus, cloud provider 330 includes at least targets 331 and 332, and cloud provider 340 includes at least targets 341 and 342. Note that while FIG. 3 shows only two cloud providers, each associated with two different targets, that there may be any number of different cloud providers, each containing any number of targets.

To prepare the synchronization service 320 in order to generate and execute configuration commands in response to received synchronization requests, such as the synchronization request 310, an administrator associated with the synchronization service 320 may set up and configure projects and targets for management. For example, one or more projects and targets may be set up which may be managed by one or more operators of the synchronization service 320. A project may be configured to be authorized to manage any of a number of different targets, such as one or more of the targets 331-332 and 341-342. Each target may be associated with one or more configuration repositories and version repositories indicating a version of a configuration of each target, such as the configuration repository 321 and version repository 322. Operators associated with a project may execute a cloud deployment by sending updated configuration information to the configuration repository 321 and setting the corresponding version of the configuration in the version repository 322. The synchronization service may subsequently identify the files in the configuration repository 321 associated with the updated configuration, such as one or more state files, using the version information in the version repository 322. For example, the version information in the version repository 322 may indicate the version and location of the configuration in the configuration repository 321, such as by providing a reference to the location of corresponding state files in the configuration repository 321.

After configuration and version information are stored in the configuration repository 321 and version repository 322, the synchronization service may receive synchronization requests, and generate configuration commands responsive to such requests. In accordance with some example implementations, a synchronization request 310 may be received by the synchronization service 320. The synchronization request 310 may be a request to synchronize a target to a specified state. For example, the synchronization request 310 may be a request to synchronize target 332 to a particular version of the configuration, such as indicating a reference in the version repository 322 corresponding to a one or more state files in the configuration repository 321.

In response to receiving the synchronization request 310, the synchronization service may then generate one or more configuration commands. For example, the configuration command generator 323 may generate the one or more configuration commands in response to receiving the synchronization request 310. In some aspects, the configuration command generator 323 may generate the one or more configuration commands based on parsing the synchronization request 310, based on the contents of the configuration repository 321 and based on the cloud configuration framework associated with the target of the synchronization request 310.

In some aspects, the configuration command generator 323 may identify the state files in the configuration repository 321 corresponding to the state specified in the synchronization request 310. For example, the synchronization request 310 may indicate a version to which a specified target is to be synchronized, and the configuration command generator 323 may identify the state files in the configuration repository 321 corresponding to this version. In some aspects, the state files may be identified using information in the version repository 322 referencing the location of the state files in the configuration repository 321.

The configuration command generator 323 may also identify a cloud configuration framework associated with the target of the synchronization request 310. For example, the cloud configuration framework may be indicated in the configuration repository 321, for example in one or more state files, may be indicated by a project to which the target is assigned, may be indicated in information associated by version information in the version repository 322, may be indicated in the synchronization request 310, and so on.

The configuration command generator 323 may also identify the target of the synchronization request 310, such as the cloud provider associated with the target cloud resources and an account associated with that cloud provider. For example, if target 332 is the target of the synchronization request 310, the configuration command generator 323 may identify the cloud provider as cloud provider 330.

The configuration command generator 323 may then generate one or more configuration commands, such as one or more commands for a command line interface (CLI) for synchronizing the target cloud resources to the state specified in the synchronization request 310. More particularly, the one or more generated configuration commands may be in accordance with a command syntax associated with the identified cloud provider. Further, the one or more configuration commands may be generated in accordance with the command structure and definitions of the cloud configuration framework associated with the target of the synchronization request 310. Further, the one or more configuration commands may be generated based on data in the configuration repository 321 and version repository 322 corresponding to the synchronization request 310. The generated one or more configuration commands may then be executed in order to synchronize the target cloud resources to the specified state.

Figure 4:
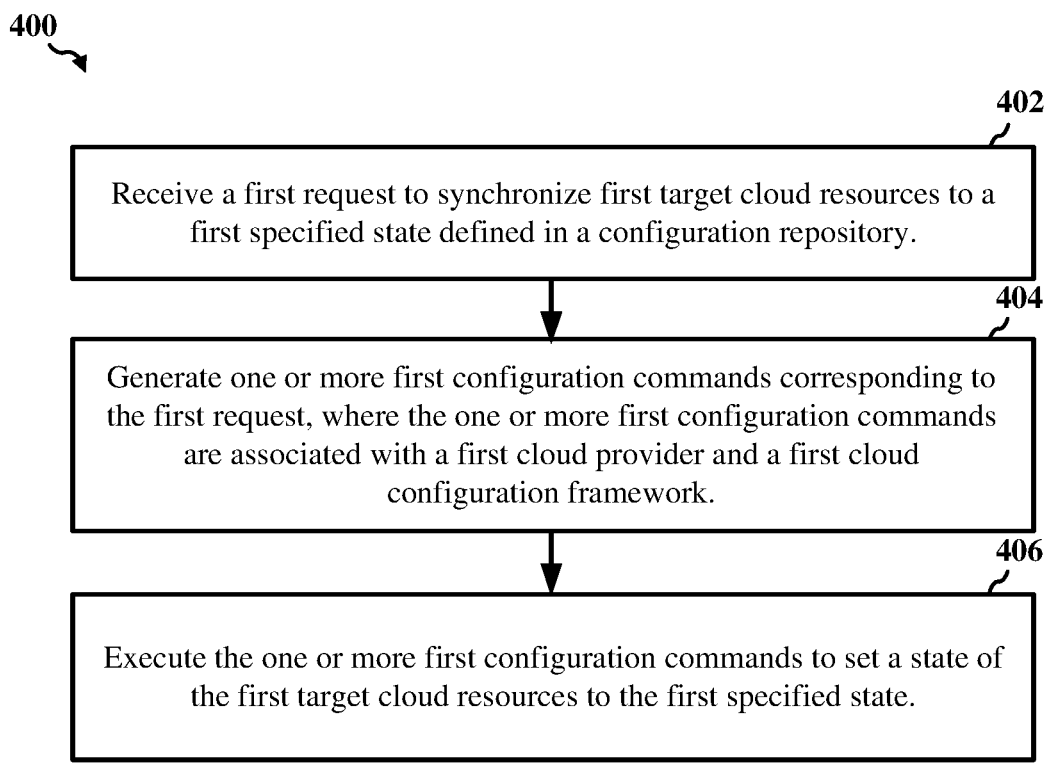
FIG. 4 shows an illustrative flow chart depicting an example operation for synchronizing cloud resources, according to some implementations.

FIG. 4 shows an illustrative flow chart depicting an example operation 400 for synchronizing cloud resources, according to some implementations. The example operation 400 may be performed by one or more processors of a computing device such as the cloud resource synchronization system 100 of FIG. 1. It is to be understood that the example operation 400 may be performed by any suitable systems, computers, or servers.

At block 402, the cloud resource synchronization system 100 receives a first request to synchronize first target cloud resources to a first specified state defined in a configuration repository. At block 404, the cloud resource synchronization system 100 generates one or first configuration commands corresponding to the first request, where the one or more first configuration commands are associated with a first cloud provider and a first cloud configuration framework. At block 406, the cloud resource synchronization system 100 executes the one or more first configuration commands to set a state of the first target cloud resources to the first specified state.

In some aspects, the one or more configuration commands are generated in accordance with a syntax associated with the first cloud provider. In some aspects, the one or more configuration commands are generated in accordance with a syntax associated with the first cloud configuration framework. In some aspects, the one or more configuration commands are generated based at least in part on one or more state files in the configuration repository.

In some aspects, the first request corresponds to a version and a location of one or more state files in the configuration repository associated with the first specified state. In some aspects, the configuration repository is a Git repository.

In some aspects, the operation 400 also includes receiving a second request to synchronize second cloud resources to a second specified state defined in the configuration repository, generating one or more second configuration commands corresponding to the second request, where the one or more second configuration commands are associated with a second cloud provider and a second cloud configuration framework, and executing the one or more second configuration commands to set a state of the second target cloud resources to the second specified state. In some aspects, the first cloud provider is different from the second cloud provider. In some aspects, the first cloud configuration framework is different from the second cloud configuration framework.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of synchronizing cloud resources, comprising:
   receiving a first request to synchronize first target cloud resources to a first specified state defined in a configuration repository;
   generating one or more first configuration commands corresponding to the first request, the one or more first configuration commands associated with a first cloud provider and a first cloud configuration framework; and
   executing the one or more first configuration commands to set a state of the first target cloud resources to the first specified state.

2. The method of claim 1, wherein the one or more configuration commands are generated in accordance with a syntax associated with the first cloud provider.

3. The method of claim 1, wherein the one or more configuration commands are generated in accordance with a syntax associated with the first cloud configuration framework.

4. The method of claim 1, wherein the one or more configuration commands are generated based at least in part on one or more state files in the configuration repository.

5. The method of claim 1, wherein the first request corresponds to a version and a location of one or more state files in the configuration repository associated with the first specified state.

6. The method of claim 1, wherein the configuration repository is a Git repository.

7. The method of claim 1, further comprising:
   receiving a second request to synchronize second target cloud resources to a second specified state defined in the configuration repository;
   generating one or more second configuration commands corresponding to the second request, the one or more second configuration commands associated with a second cloud provider and a second cloud configuration framework; and
   executing the one or more second configuration commands to set a state of the second target cloud resources to the second specified state.

8. The method of claim 7, wherein the first cloud provider is different from the second cloud provider.

9. The method of claim 7, wherein the first cloud configuration framework is different from the second cloud configuration framework.

10. A system for synchronizing cloud resources, comprising:
    one or more processors; and
    a memory storing instructions that, when executed by the one or more processors, cause the system to perform operations comprising:
      receiving a first request to synchronize first target cloud resources to a first specified state defined in a configuration repository;
      generating one or more first configuration commands corresponding to the first request, the one or more first configuration commands associated with a first cloud provider and a first cloud configuration framework; and
      executing the one or more first configuration commands to set a state of the first target cloud resources to the first specified state.

11. The system of claim 10, wherein the one or more configuration commands are generated in accordance with a syntax associated with the first cloud provider.

12. The system of claim 10, wherein the one or more configuration commands are generated in accordance with a syntax associated with the first cloud configuration framework.

13. The system of claim 10, wherein the one or more configuration commands are generated based at least in part on one or more state files in the configuration repository.

14. The system of claim 10, wherein the first request corresponds to a version and a location of one or more state files in the configuration repository associated with the first specified state.

15. The system of claim 10, wherein the configuration repository is a Git repository.

16. The system of claim 10, wherein execution of the instructions causes the system to perform operations further comprising:
    receiving a second request to synchronize second target cloud resources to a second specified state defined in the configuration repository;
    generating one or more second configuration commands corresponding to the second request, the one or more second configuration commands associated with a second cloud provider and a second cloud configuration framework; and
    executing the one or more second configuration commands to set a state of the second target cloud resources to the second specified state.

17. The system of claim 16, wherein the first cloud provider is different from the second cloud provider.

18. The system of claim 16, wherein the first cloud configuration framework is different from the second cloud configuration framework.

19. A non-transitory computer-readable storage medium storing instructions that, when executed by one or more processors of a system, causes the system to perform operations comprising:
    receiving a first request to synchronize first target cloud resources to a first specified state defined in a configuration repository;
    generating one or more first configuration commands corresponding to the first request, the one or more first configuration commands associated with a first cloud provider and a first cloud configuration framework; and executing the one or more first configuration commands to set a state of the first target cloud resources to the first specified state.

20. The non-transitory computer-readable storage medium of claim 19, wherein execution of the instructions causes the system to perform operations further comprising:

receiving a second request to synchronize second target cloud resources to a second specified state defined in the configuration repository;

generating one or more second configuration commands corresponding to the second request, the one or more second configuration commands associated with a second cloud provider and a second cloud configuration framework, wherein the first cloud provider is different from the second cloud provider, and the first cloud configuration framework is different from the second cloud configuration framework; and executing the one or more second configuration commands to set a state of the second target cloud resources to the second specified state.

* * * * *